United States Patent
Alain et al.

(10) Patent No.: US 9,661,334 B2
(45) Date of Patent: May 23, 2017

(54) METHOD AND APPARATUS FOR CONSTRUCTING AN EPITOME FROM AN IMAGE

(71) Applicant: THOMSON LICENSING, Issy de Moulineaux (FR)

(72) Inventors: Martin Alain, Rennes (FR); Dominique Thoreau, Cesson-Sevigne (FR); Philippe Guillotel, Cesson-Sevigne (FR); Christine Guillemot, Vern sur Seiche (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 81 days.

(21) Appl. No.: 14/608,168

(22) Filed: Jan. 28, 2015

(65) Prior Publication Data

US 2015/0215629 A1 Jul. 30, 2015

(30) Foreign Application Priority Data

Jan. 30, 2014 (EP) .................................... 14305132

(51) Int. Cl.
*H04N 19/176* (2014.01)
*H04N 19/89* (2014.01)
(Continued)

(52) U.S. Cl.
CPC ......... *H04N 19/176* (2014.11); *H04N 19/593* (2014.11); *H04N 19/89* (2014.11); *H04N 19/99* (2014.11); *H04N 19/147* (2014.11)

(58) Field of Classification Search
CPC .. H04N 19/147; H04N 19/176; H04N 19/539; H04N 19/89; H04N 19/99
(Continued)

(56) References Cited

U.S. PATENT DOCUMENTS 7,978,906 B2 * 7/2011 Jojic ..................... G06K 9/469
382/159
8,204,338 B2 6/2012 Hoppe et al.
(Continued)

FOREIGN PATENT DOCUMENTS

EP 2011794733 4/2006
EP 2666291 11/2013
(Continued)

OTHER PUBLICATIONS

Wang et al. ("Factoring Repeated Content Within and Among Images," ACM Transactions on Graphics, vol. 27, No. 3, Aug. 2008).*

(Continued)

*Primary Examiner* — Yubin Hung
(74) *Attorney, Agent, or Firm* — Tutunjian & Bitetto, P.C.

(57) ABSTRACT

A method for constructing an epitome from an image divided into non overlapping blocks is disclosed. The method comprises:
 determining, for each block, similar patches in the image, a similar patch being a patch with similar content;
 constructing at least one epitome chart for the picture from the similar patches;
wherein determining, for each block, similar patches in the image comprises:
 a) determining, for each current block, similar blocks in the image, a similar block being a block with content similar to the content of the current block;
 b) determining, for one current block and for the similar blocks determined for the current block, similar patches in the image, a similar patch being a patch with content similar to the content of the current block;

(Continued)

c) repeating step b) for a next current block for which no similar patch is determined until at least one similar patch is determined for each block in the image.

3 Claims, 6 Drawing Sheets

(51) Int. Cl.
*H04N 19/593* (2014.01)
*H04N 19/90* (2014.01)
*H04N 19/147* (2014.01)

(58) Field of Classification Search
USPC .......................................................... 382/243
See application file for complete search history.

(56) References Cited

U.S. PATENT DOCUMENTS

| | | | |
|---|---|---|---|
| 8,478,057 | B1 | 7/2013 | Cui et al. |
| 2009/0208110 | A1* | 8/2009 | Hoppe .................... G06T 7/407 382/190 |
| 2013/0142405 | A1* | 6/2013 | Nada ...................... G06K 9/001 382/124 |
| 2013/0223529 | A1 | 8/2013 | Amonou |

FOREIGN PATENT DOCUMENTS

| | | |
|---|---|---|
| WO | WO2012097882 | 7/2012 |
| WO | WO2012097919 | 7/2012 |

OTHER PUBLICATIONS

Suzuki et al. ("Image coding by using structure-texture decomposition and an analysis of their relationship," IEEE Workshop on Signal Processing System, Oct. 6-8, 2010, pp. 105-110).*

Wang et al. ("Intra coding and refresh based on video epitomic analysis," IEEE International Conference on Multimedia and Expo (ICME), Jul. 19-23, 2010).*

Cherigui et al: "Epitome-based image compression using translational sub-pel mapping", Multimedia Signal Processing (MMSP), 2011 IEEE 13th International workshop on, IEEE, Oct. 17, 2011, pp. 1-6.

Suzuki et al: "Image coding by using structure/texture decomposition and an analysis of their relationship", 2010 IEEE Workshop on Signal Processing System (SIPS 2010): Oct. 6-8, 2010, IEEE, , Oct. 6, 2010, pp. 105-110.

Wang et al: "Factoring repeated content within and among images", ACM SIGGRAPH 2008 Papers (SIGGRAPH' 08), Aug. 11, 2008, pp. 1-10.

Chu: "Epitome and its applications", Thesis, Univerisity of Illinois, 2012; pp. 1-40.

Aharon et al: "Sparse and redundant modeling of image content using an image signature directory", SIAM Journal of imaging sciences, vol. 1, No. 3, pp. 228-247, Jul. 2008.

Barnes etal: "PatchMatch: A Randomized Correspondence Algorithm for Structural Image Editing", ACM transactions on graphics (Proc. SIGGRAPH), vol. 28, No. 3, Aug. 2009; pp. 1-10.

Barnes etal: "The Generalized PatchMatch Correspondence Algorithm", European conference on comptuer vision (ECCV), Sep. 2010; pp. 1-14.

Bentley: "Multidimensional binary search trees used for associative searching", commun. ACM, vol. 18, No. 9, pp. 509-517, 1975.

Bhatia: "Adaptive K means clustering", in FLAIRS conference, May 2004; pp. 1-5.

Cheung et al: "Video epitomes", international journal of computer vision, vol. 76-2, pp. 141-152, Feb. 2008.

Jojic et al: "Epitomic analysis of appearance and shape", in Proc. IEEE conf. comput. vis. (ICCV), 2003, pp. 34-41.

Lucas et al: "An Iterative Image Registration Technique with an Application to Stereo Vision", in proceedings of imaging understanding workshop, 1981; pp. 121-130.

Shi et al: "Good features to track", in IEEE conf. on computer vision and pattern recognition (CVPR), 1994; pp. 595-600.

Simakov et al: "Summarizing visual data using bidirectional similarity", in IEEE conf. on computer vision and pattern recognition (CVPR), 2008, pp. 1-8.

Wang et al: "Improving intra coding in H264_AVC by image epitome", in advanced in multimedia information processing (PCM), 2009, pp. 190-200.

Wang et al: "Intra coding and refresh based on video epitomic analysis", in IEEE international conference on multimedia and expo (ICME), 2010, pp. 452-455.

Alain et al: "Clustering based methods for fast epitome generation" EUSIPCO 2014; pp. 1-5.

Search Report Dated Apr. 15, 2014.

* cited by examiner

METHOD AND APPARATUS FOR CONSTRUCTING AN EPITOME FROM AN IMAGE

This application claims the benefit, under 35 U.S.C. §119 of European Patent Application No. 14305132.4, filed Jan. 30, 2014.

1. TECHNICAL

The present disclosure relates to image epitome construction.

2. BACKGROUND ART

An epitome of an image is a condensed representation containing the essence of the textural and structure properties of the image. The epitome approach aims at reducing redundant information (texture) in the image by exploiting repeated content within the image.

It is known to factor an image into a texture epitome E and a transform map $\phi$. The epitome principle was first disclosed by Wang et al. in the article entitled *"Factoring Repeated Content Within and Among Images"* published in the proceedings of ACM SIGGRAPH 2008 (ACM Transaction on Graphics, vol. 27, no. 3, pp. 1-10, 2008). FIG. 1 illustrates the method of Hoppe. From an image Y, a texture epitome E and a transform map $\phi$ are determined such that all image blocks of Y can be reconstructed from matched patches of E. A matched patch is also known as transformed patch. As opposed to blocks, the patches belong to a pixel grid. Once the self-similarities are determined in the image Y, the method of Hoppe determines redundant texture patches to construct epitome charts, the union of all epitome charts constituting the texture epitome E. Each epitome chart represents repeated regions in the image. The construction of an epitome chart is composed of a chart initialization step followed by several chart extension steps. The transform map $\phi$ is an assignation map that keeps track of the correspondences between each block of the image Y and a texture patch of the texture epitome E. The transform map is also known as vector map or assignment map in the literature. With the texture epitome E and the transform map $\phi$, one is able to reconstruct an image Y' whose content is very similar to the content of the image Y. In the following the epitome designates both the texture epitome E and the transform map $\phi$.

In European patent application EP2011794733, a method to construct an epitome is disclosed that comprises finding self-similarities among the image and then determines redundant texture patches to construct epitome charts. Specifically, finding self-similarities comprises for each block Bi in the image Y, determining a set of patches in the same image with similar content, i.e. that approximates Bi with a given error tolerance $\epsilon$. Such a solution is time consuming and memory demanding.

3. BRIEF SUMMARY

A method for constructing an epitome from an image divided into non overlapping blocks is disclosed. The method comprises:
   determining, for each block, similar patches in the image, a similar patch being a patch with similar content; and
   constructing at least one epitome chart for said picture from said similar patches.

Advantageously, determining, for each block, similar patches in the image comprises:
   a) determining, for each current block, similar blocks in the image, a similar block being a block with content similar to the content of said current block;
   b) determining, for one current block and for the similar blocks determined for said current block, similar patches in the image, a similar patch being a patch with content similar to the content of said current block;
   c) repeating step b) for a next current block for which no similar patch is determined until at least one similar patch is determined for each block in the image.

The determination of similar blocks before determining the similar patches accelerates the finding of self-similarities and lower the memory consumption.

According to a specific embodiment, determining, for each current block, similar blocks in the image Y comprises calculating a distance between content of said current block and content of blocks in the image and determining, as similar blocks, those blocks for which the calculated distance is below a first threshold value.

Exemplarily, determining, for one current block and for the similar blocks determined for said current block, similar patches in the image comprises calculating a distance between content of said current block and content of patches in the image and determining, as similar patches, the patches for which the calculated distance is below a second threshold value higher than the first threshold value.

Advantageously, the method further comprises determining, for similar blocks determined for said current block, among said similar patches, the similar patches whose distance to the current block is below a threshold value equal to the difference between said second threshold and said first threshold.

An apparatus for constructing an epitome from an image divided into non overlapping blocks is further disclosed. The apparatus comprises at least one processor configured to:
   a) determine, for each current block, similar blocks in the image, a similar block being a block with content similar to the content of said current block;
   b) determine, for one current block and for the similar blocks determined for said current block, similar patches in the image, a similar patch being a patch with content similar to the content of said current block;
   c) repeat step b) for a next current block for which no similar patch is determined until at least one similar patch is determined for each block in the image; and
   d) construct at least one epitome chart for said picture from said similar patches.

In a variant, an apparatus for constructing an epitome from an image divided into non overlapping blocks is disclosed that comprising:
   means for determining, for each block, similar patches in the image, a similar patch being a patch with similar content;
   means for constructing at least one epitome chart for said picture from said similar patches;
   wherein said means for determining, for each block, similar patches in the image comprises:
   a) means for determining, for each block, similar blocks in the image, a similar block being a block with content similar to the content of said current block;
   b) means for determining, for one current block and for the similar blocks determined for said current block, similar patches in the image, a similar patch being a patch with content similar to the content of said current block;

c) means for repeating step b) for a next current block for which no similar patch is determined until at least one similar patch is determined for each block in the image.

A computer program product is disclosed that comprises program code instructions to execute of the steps of the method for constructing an epitome when this program is executed on a computer.

A processor readable medium is disclosed that has stored therein instructions for causing a processor to perform at least the steps of the method for constructing an epitome.

4. BRIEF DESCRIPTION OF THE DRAWINGS

5. DETAILED DESCRIPTION

Figure 1:
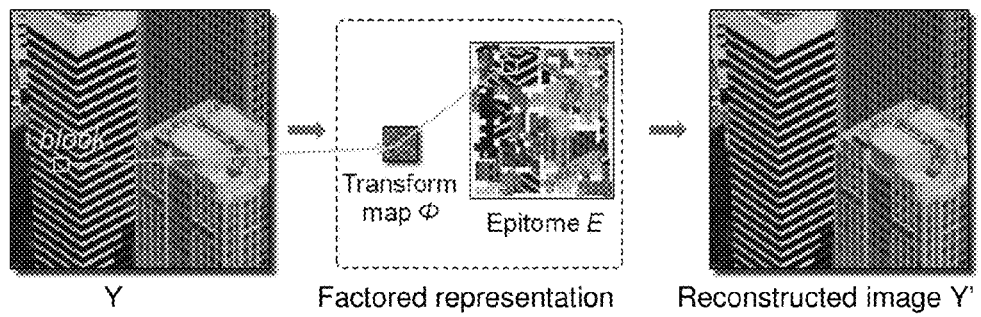
FIG. 1 illustrates the construction of an epitome from an image Y and the reconstruction of an image Y' from a texture epitome E and a transform map ϕ according to the prior art.
Figure 2:
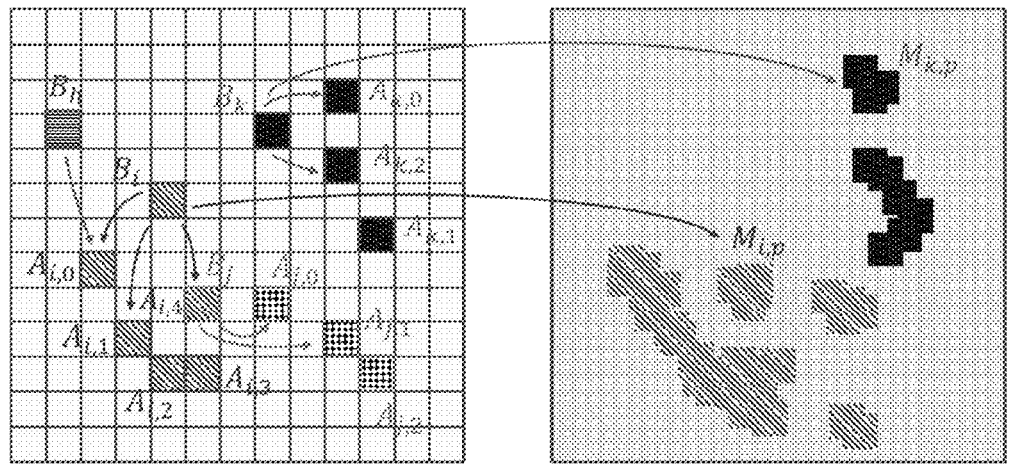
FIG. 2 represents on the left a picture Y divided into non overlapping blocks and on the right the selection of patches to construct an epitome according to a specific and non-limitative embodiment.

A method of constructing an epitome of an image divided into non-overlapping blocks is disclosed. A block is located on a block grid as depicted on the left part of FIG. 2. A patch is a block of pixels located on the pixel grid as depicted on right part of FIG. 2. In the following, the word "block" is used to designate the blocks of pixels located on the block grid while the word "patch" is used to designate the blocks of pixels located on the pixel grid.

Figure 3:
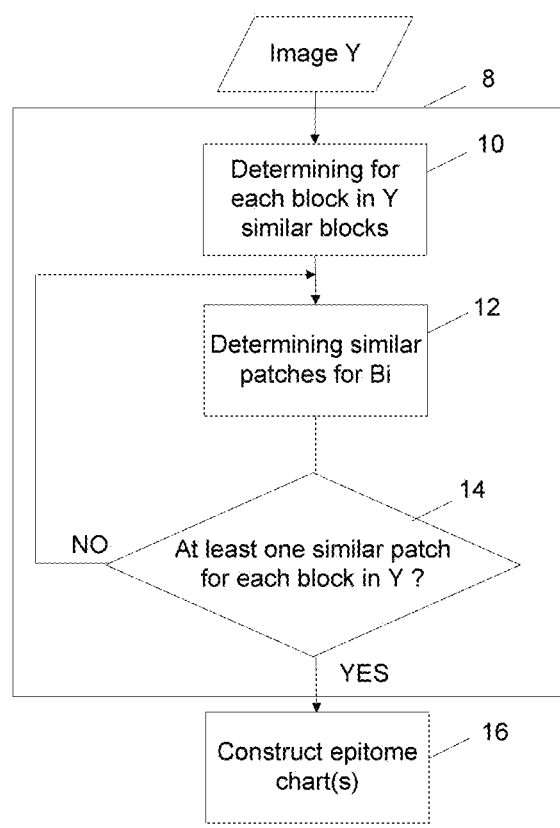
FIG. 3 represents a flowchart of a method for epitome construction according to a specific and non-limitative embodiment.

FIG. 3 represents a flowchart of the method for constructing an epitome from a current image Y according to a specific and non-limitative embodiment. The current image Y is factorized, i.e. a texture epitome E and a transform map ϕ are determined for the current image. The texture epitome E is determined from pieces of texture (e.g. a set of charts) taken from the current image. The method is disclosed for a current image and can be applied on each image of a sequence of images. The method comprises, in a step 8, determining for each block in the image Y at least one similar patch also called matched patch and, in a step 16, constructing at least one epitome chart from the matched patches determined in the step 8. The step 8 is detailed below.

In a step 10, similar block(s) $A_{i,I}$ are determined for each block $B_i$ in the image Y, where i is an integer identifying the block $B_i$ and I is an integer identifying the similar block $A_{i,I}$. A block is similar to the block $B_i$ if a distance d calculated between the content of these two blocks is below a first threshold value $\epsilon_A$. The distance d equals for example the Sum of Absolute Differences (SAD), wherein the differences are the pixel by pixel differences between the two blocks. According to a variant, the distance equals the Sum of Square Errors (SSE), wherein the errors are the pixel by pixel differences between the two blocks. Many other such metrics may be used consistent. A block in Y can have no similar blocks, a single similar block or a plurality of similar blocks. With respect to FIG. 2, the block Bi has 5 similar blocks $A_{i,0}$, $A_{i,1}$, $A_{i,2}$, $A_{i,3}$ and $A_{i,4}$ (also referred as $B_j$). $B_j$ has 3 similar blocks $A_{j,0}$, $A_{j,1}$ and $A_{j,2}$ and $B_k$ has 3 similar blocks $A_{k,0}$, $A_{k,1}$ and $A_{k,2}$. $B_h$ has 1 similar block $A_{i,0}$.

In a step 12, similar patches $M_{i,p}$ are determined for one current block $B_i$ and for the similar blocks $A_{i,I}$ determined in step 10 for $B_i$, where p is an integer identifying the similar patch. As an example, the current block is the block for which the number of similar blocks $A_{i,I}$ determined in step 10 is the highest. If two blocks have the same number of similar blocks $A_{i,I}$, the current block can be the first block encountered when going through the picture in a specific scan order, e.g. raster scan order (i.e. from top to bottom and from left to right). With respect to FIG. 2, $B_i$ is the block with the highest number of similar blocks. According to a specific embodiment, an exhaustive search is performed in the entire image, i.e. all the patches comprised in the image are tested. According to a variant only a subset of the patches are tested, e.g. one out of two. The similar patches $M_{i,p}$, determined for the current block $B_i$ are further associated with the similar blocks $A_{i,I}$ determined in step 10 for $B_i$. With respect to FIG. 2, the set of patches $\{M_{i,0}, M_{i,1}, \ldots\}$ similar to $B_i$ are further associated with the blocks $A_{i,0}$ $A_{i,1}$, $A_{i,2}$, $A_{i,3}$ and $A_{i,4}$, i.e. the patches $\{M_{i,0}, M_{i,1}, \ldots\}$ are also considered to be patches similar to the similar blocks $A_{i,0}$ $A_{i,1}$, $A_{i,2}$, $A_{i,3}$ and $A_{i,4}$. The similar patches $M_{i,p}$, also called matched patches, are the patches whose content is similar to the content of the current block $B_i$. A patch $M_{i,j}$ is similar to $B_i$ when the distance d calculated between the current block $B_i$ and the patch $M_{i,j}$ is below a second threshold value $\epsilon_M$ higher than the first threshold $\epsilon_A$. According to a specific embodiment, $$\epsilon_A = \alpha_A * \epsilon_M \text{ with } 0 \le \alpha_A < 1$$

The value of $\epsilon_A$ is set via the coefficient $\alpha_A$. In practice, an appropriate value for $\alpha_A$ is 0.5. When the method of epitome construction is used in an encoder/decoder, the value of the parameter $\alpha_A$ could be particularly useful in order to tune the complexity of the encoder/decoder.

This solution advantageously reduces the number of blocks considered during step 12 for the determination of similar patches. By doing so, a patch similar to a current block $B_i$ can have a distance to a similar block $A_{i,I}$ larger than $\epsilon_M$. According to a variant, only a subset of the patches $\{M_{i,0}, M_{i,1}, \ldots\}$ similar to the current block $B_i$ are associated with the similar blocks $A_{i,I}$. Specifically, a patch $M_{i,p}$ similar to a current block $B_i$ is further associated with a similar block $A_{i,I}$ when the following equation is verified: $d(M_{i,p}; B_i) \le \epsilon_M - \epsilon_A$, where $d(M_{i,p}; B_i)$ is the distance between the contents of $B_i$ and $M_{i,k}$. This ensures that the distance d between any similar block $A_{i,I}$ and any of its matched is below the second threshold value $\epsilon_M$. At the end, for each block $B_i$ belonging to the block grid, a list $L_{match}(B_i) = \{M_{i,0}, M_{i,1}, \ldots\}$ of matched patches is determined that approximate $B_i$ with a given error tolerance $\epsilon_M$.

The step 12 is repeated for a next current block for which no matched patch is determined until at least one matched patch is determined (step 14) for each block. Consequently, the step 12 is not repeated for blocks $A_{i,0}$, $A_{i,1}$, $A_{i,2}$, $A_{i,3}$ and Bj ($=A_{i,4}$) because these blocks already have matched patches, namely the patches {$M_{i,0}$, $M_{i,1}$, ... } similar to block $B_i$. When matched patches have already been determined for a block, the block is removed from the list of similar blocks it belongs to. Exemplarily, $A_{i,0}$ is a block similar to $B_i$ and $B_h$. Consequently, $A_{i,0}$ is removed from the list of blocks similar to $B_h$ because the matched patches {$M_{i,0}$, $M_{i,1}$, ... } are associated with $A_{i,0}$ when considering block $B_i$. According to a variant, a block $A_{n,m}$ belonging to several lists of similar blocks is left in the list of the block to which $A_{n,m}$ is the closest in the sense of the distance d. Exemplarily, if $A_{n,m}$ is a block similar to $B_p$ and $B_q$ and $d(A_{n,m}, B_q) < d(A_{n,m}, B_p)$ then $A_{n,m}$ is removed from the list of blocks similar to $B_p$ and left in the list of blocks similar to $B_q$.

Figure 4:
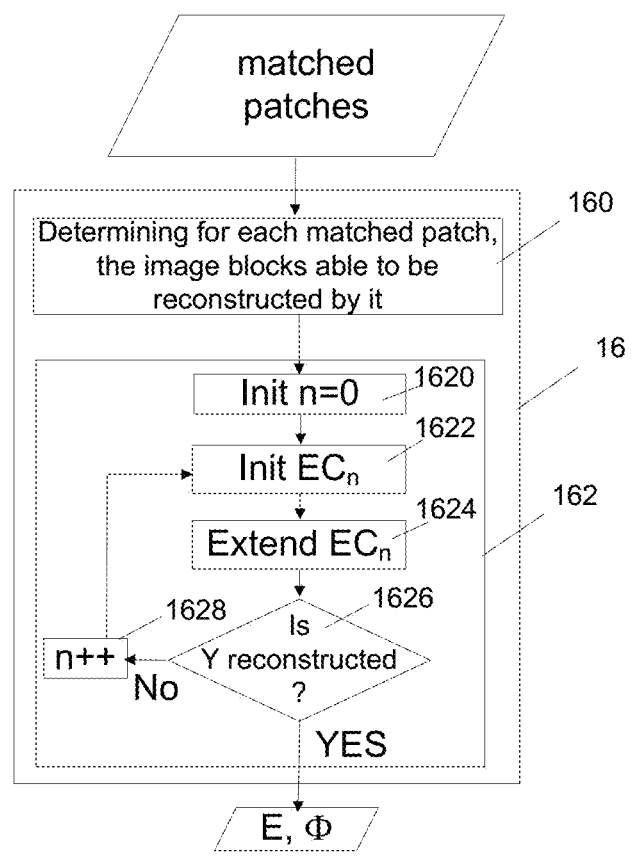
FIG. 4 represents a detail of the flowchart depicted on FIG. 3.

In a step 16, at least one epitome chart is constructed from the lists of matched patches. The method of Wang disclosed in the article entitled *"Factoring Repeated Content Within and Among Images"* published in the proceedings of ACM SIGGRAPH 2008 (ACM Transaction on Graphics, vol. 27, no. 3, pp. 1-10, 2008) can be used. Many other such methods for constructing epitome chart(s) using lists of matched patches may be used. According to a specific and non-limiting embodiment depicted on FIG. 4, constructing at least one epitome chart comprises, in a step 160, determining new lists $L'_{match}(M_{j,l})$ indicating the set of image blocks that can be represented, i.e. able to be reconstructed, by a patch $M_{j,l}$. The new lists $L'_{match}(M_{j,l})$ are determined for example by reversing the lists $L_{match}(B_i)$ determined in step 12. One block $B_i$ can be in two different lists $L'_{match}(M_{j,l})$.

In a step 162, at least one epitome chart is constructed. To this aim, matched patches are selected in order to construct epitome charts, the union of all the epitome charts constituting the texture epitome E. A matched patch selected to be part of an epitome chart is called an epitome patch. Each epitome chart represents specific regions of the image Y in term of texture. Step 162 is detailed below.

In a step 1620, an index n is set equal to 0, n is an integer. In a step 1622, a first epitome chart $EC_n$ is initialized. Several candidate matched patches can be used to initialize the epitome chart $EC_n$. Each epitome chart is initialized by the matched patch E0 which is the most representative of the not yet reconstructed, i.e. represented, remaining blocks. A block $B_i$ is able to be reconstructed by a matched patch $M_{j,l}$ if $B_i$ belong to the list $L'_{match}(M_{j,l})$. Let $Y \in R^{N \times M}$ denote the input image and let $Y' \in R^{N \times M}$ denote the image reconstructed by a candidate matched patch and the epitome charts previously constructed. To initialize a chart, a selection criterion based on the minimization of the MAE (equation 1) or of the Mean Square Error (equation 2) criterion can be used:

$$FC_{init} = \min\left(\frac{\Sigma_i^N \Sigma_j^M |Y_{i,j} - Y'_{i,j}|}{N * M}\right) \quad (1)$$

$$FC_{init} = \min\left(\frac{\Sigma_i^N \Sigma_j^M (Y_{i,j} - Y'_{i,j})^2}{N * M}\right) \quad (2)$$

where $Y_{i,j}$ is the image value of pixel (i,j) in the image Y and $Y'_{i,j}$ is the image value of pixel (i,j) in the reconstructed image Y'. Other metrics can be used to compute the reconstruction error.

Figure 5:
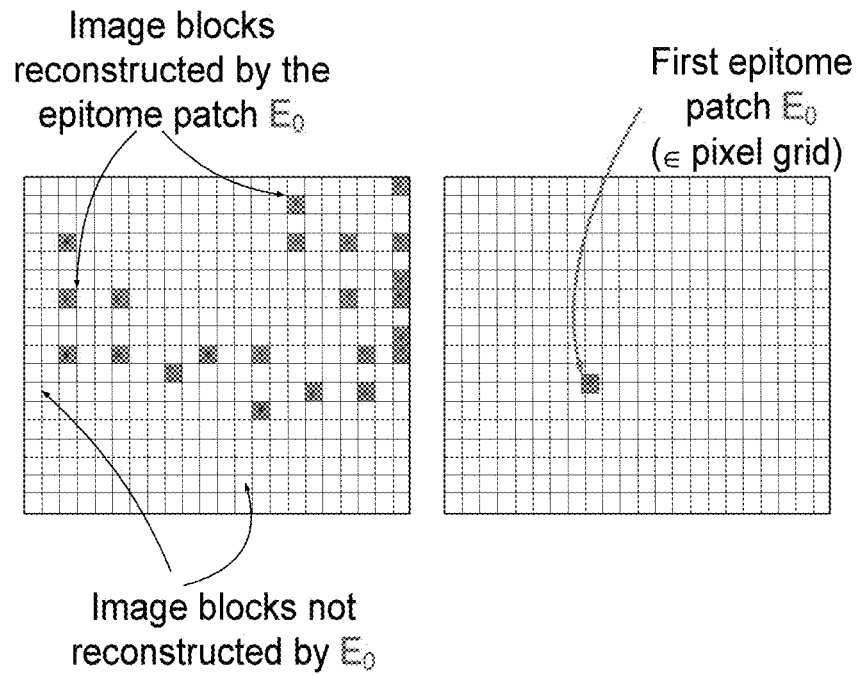
FIG. 5 represents a chart initialization step: on the left, grey blocks in the image are the blocks able to be reconstructed by the current chart, the current epitome $EC_n$ being initially represented by a single patch $E_0$.

The selected criterion takes into account the reconstruction errors on the whole image. This criterion allows the epitome to be extended by a texture pattern that allows the reconstruction of the largest number of blocks while minimizing the reconstruction error. The reconstruction error is computed between the image Y and the image Y' reconstructed from the current epitome. The current epitome comprises a candidate matched patch and the epitome charts previously constructed. In a specific and non-limitative embodiment, when computing the image reconstruction error, a zero value is assigned to the pixels of blocks in the image Y' that are not yet represented by epitome patches of the current epitome. Thus, the error for these pixels is equal to the value of the pixels in the original image. The issue is that the overall distortion does not only depend on the reconstructed part of the image, but also on the non-reconstructed part. According to a variant a value different from zero is used. As an example, the value 128 is used instead of zero. According to yet another variant, the error for these pixels is set to a maximum value, e.g. 255. The latter solution tends to promote reconstruction of larger part of the image, thus accelerating the creation of the epitome. FIG. 5 shows the image blocks reconstructed by the first epitome patch E0.

Figure 6:
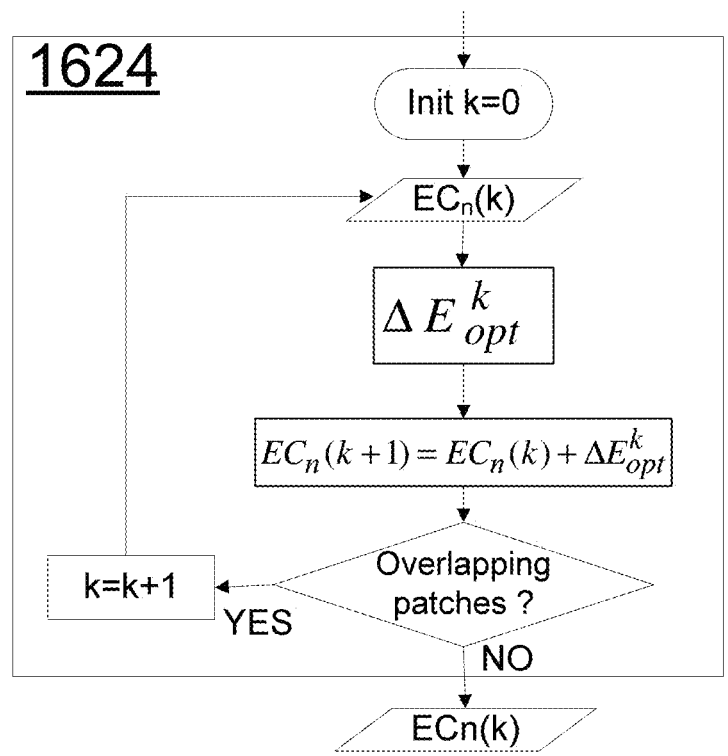
FIG. 6 represents a detail of the flowchart depicted on FIG. 4.
Figure 7:
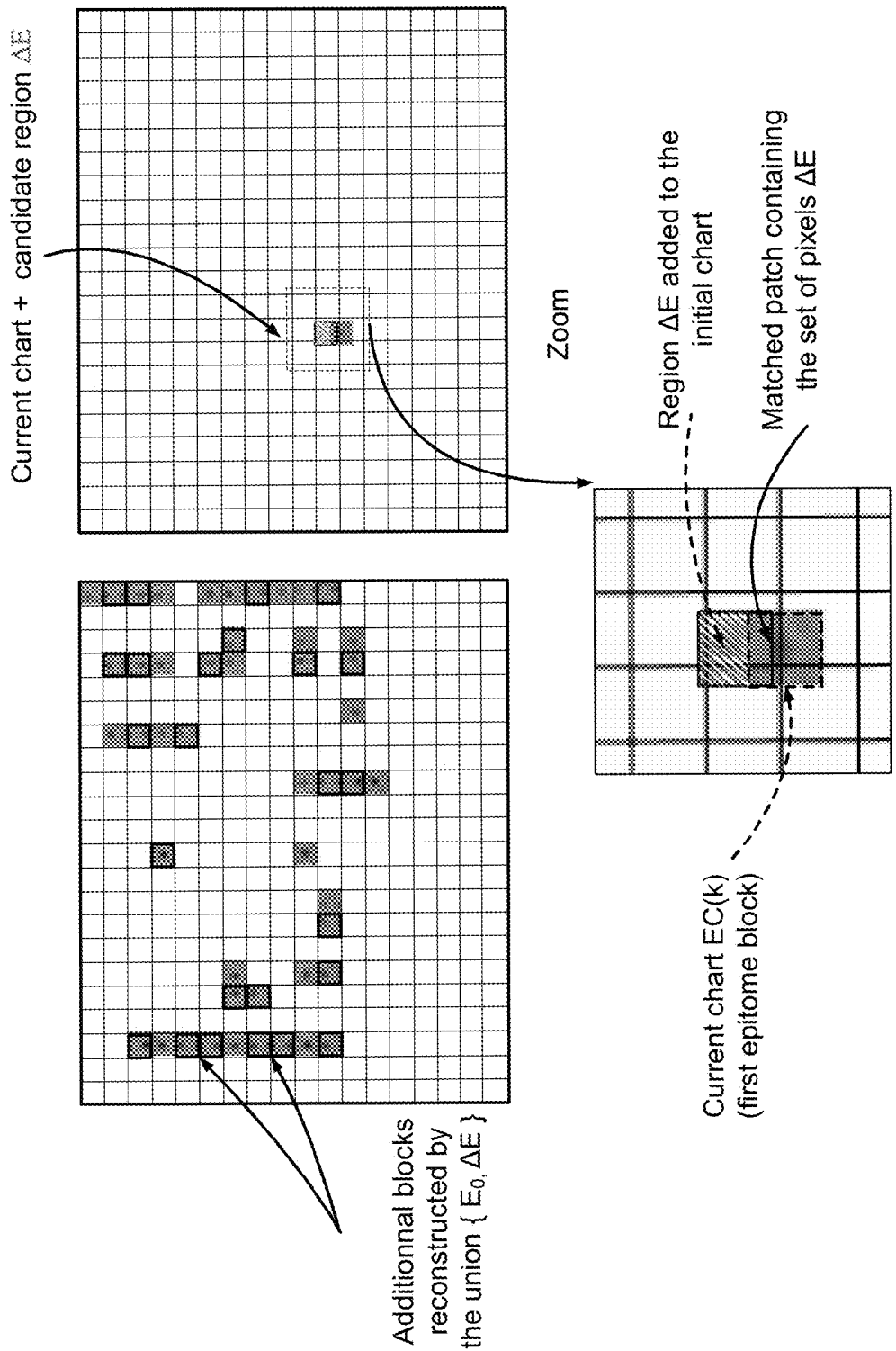
FIG. 7 illustrates an extension chart step: image blocks reconstructed by the current epitome (left) and the current epitome (right) extended by an increment ΔE.

In a step 1624, the epitome chart $EC_n$ is then progressively enlarged. The step is detailed on FIG. 6. Each time the epitome chart is enlarged, one keeps track of the number of additional blocks which can be reconstructed in the image as depicted on FIG. 7. This step is also known as epitome chart extension. The initial epitome chart $EC_n(0)$ corresponds to the matched patch selected at the initialization step 1622. The epitome enlargement step proceeds first by determining the set of matched patches $M_{j,l}$ that overlap the current chart $EC_n(k)$ and represent other blocks, i.e. other block which are not yet represented by the current chart $EC_n(k)$, k being an integer. Therefore, there are several candidates regions $\Delta E$ that can be used as an extension of the current epitome chart. For each chart growth candidate $\Delta E$, the supplement image blocks that can be reconstructed is determined from the list $L'_{match}(M_{j,k})$ related to the matched patch $M_{j,k}$ containing the set of pixels $\Delta E$. According to a specific and non-limitative embodiment, the additional blocks able to be reconstructed/represented by "inferred patches" as defined in EP2011794733 are also determined. The candidate $\Delta E_{opt}$ leading to best match according to a rate distortion criterion is selected among the set of the candidate chart growths. Let $Y \in R^{N \times M}$ denote the input image and let $Y' \in R^{N \times M}$ denote the image reconstructed by the current epitome $E_{curr}$ and a chart growth candidate $\Delta E$. Note that the current epitome $E_{curr}$ is composed of previously constructed epitome charts and the current epitome chart $EC_n(k)$. This selection is for example made according to a rate distortion minimization of the lagrangian criterion $FC_{ext}$:

$$FC_{ext} = \min(D_{E_{curr}+\Delta E} + \lambda * R_{E_{curr}+\Delta E})$$

with $$E_{curr} = \sum_{i=0}^{n} EC_i$$

$$\Delta E_{opt}^k = \underset{\Delta E}{\operatorname{argmin}}(D_{E_{curr}+\Delta E} + \lambda * R_{E_{curr}+\Delta E})$$

where D is a distortion and R a rate.

Exemplarily, $$\Delta E_{opt}^k = \operatorname{argmin}_{\Delta E}\left(\frac{\Sigma_i^N \Sigma_j^M |Y_{i,j} - Y'_{i,j}|}{N * M} + \lambda * \left(\frac{EC(k) + \Delta E}{N * M}\right)\right)$$

According to a variant, $$\Delta E_{opt}^{k} = \underset{\Delta E}{\operatorname{argmin}} \left( \frac{\Sigma_{i}^{N} \Sigma_{j}^{M} (Y_{i,j} - Y'_{i,j})^{2}}{N*M} + \lambda * \left( \frac{EC(k) + \Delta E}{N*M} \right) \right)$$

In a preferred embodiment, the λ value is set to 1000. The first term of the criterion refers to the average reconstruction error per pixel when the input image is reconstructed by texture information contained in the current epitome $$E_{curr} = \sum_{i=0}^{n} EC_{i}$$

and the increment ΔE. As in the initialization step, when the pixels are neither represented by the current epitome $E_{curr}$ nor by the increment nor by the inferred patches (i.e. does not belong to a block that can be reconstructed from $E_{curr}$, from the matched patch that contains the increment or from the inferred blocks), a zero value is assigned to them. According to a variant a value different from zero is used. As an example, the value 128 is used instead of zero. According to yet another variant, the error for these pixels is set to a maximum value, e.g. 255. The latter solution tends to promote reconstruction of larger part of the image, thus accelerating the creation of the epitome. The second term of the criterion corresponds to a rate per pixel when constructing the epitome, which is roughly estimated as the number of pixels in the current epitome and its increment divided by the total number of pixels in the image. After having selected the locally optimal increment $\Delta E_{opt}$, the current epitome chart becomes: $EC_{n}(k+1) = EC_{n}(k) + \Delta E_{opt}$. The assignation map is updated for the blocks newly reconstructed by $EC_{n}(k+1)$.

Then, the current chart is extended, during next iteration k+1, until there are no more matched patches $M_{i,j}$ which overlap the current chart $EC_{n}(k)$ and represent others blocks. If such overlapping patches exist then step 1624 is repeated with $EC_{n}(k+1)$.

According to a specific embodiment, when the current chart $EC_{n}(k)$ cannot be enlarged anymore, it is padded so that the current chart $EC_{n}(k)$ is aligned on the block grid. To the aim, the pixels are for example padded with their value in the original picture Y. Once the current epitome chart is padded, it is checked whether the padded chart contains new inferred patches able to reconstruct new blocks. This embodiment accelerate the reconstruction of the image especially when there are many inferred patches in the padded chart. It is preferable to pad the current epitome chart $EC_{n}(k)$ after its entire construction than padding it after each enlargement by $\Delta E_{opt}$. Indeed, the latter leads to an increase of the size of the epitome chart.

When the current chart cannot be extended anymore and when the whole image is not yet reconstructed by the current epitome (step 1626), the index n is incremented by 1 in a step 1628 and another epitome chart is constructed in a new location in the image. The method thus continues with the new epitome chart at step 1622, i.e. the new chart is first initialized before its enlargement. The process ends when the whole image is reconstructed/represented by the epitome (step 1626). The texture epitome E comprises the union of all epitome charts $EC_{n}$. The assignation map indicates for each block $B_{l}$ of the current image Y the location in the texture epitome of the epitome patch that is to be used for its reconstruction.

Figure 8:
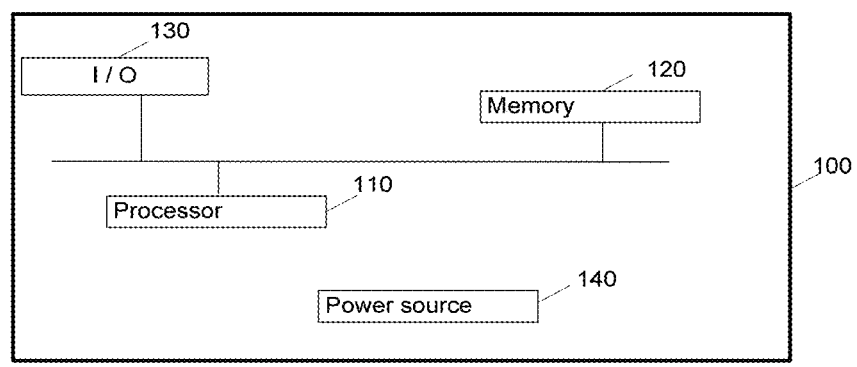
FIG. 8 represents an apparatus for epitome construction according to a specific and non-limitative embodiment.

FIG. 8 represents an exemplary architecture of an apparatus 100 configured to construct an epitome from an image Y according to an exemplary embodiment. The apparatus 100 comprises one or more processor(s) 110, which is(are), for example, a CPU, a GPU and/or a DSP (English acronym of Digital Signal Processor), along with internal memory 120 (e.g. RAM, ROM, EPROM). The apparatus 100 comprises one or several Input/Output interface(s) 130 adapted to display output information and/or allow a user to enter commands and/or data (e.g. a keyboard, a mouse, a touchpad, a webcam); and a power source 140 which may be external to the apparatus 100. The apparatus 100 may also comprise network interface(s) (not shown). The image Y may be obtained from a source. According to different embodiments, the source belongs to a set comprising:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the epitome may be sent to a destination. As an example, the epitome is stored in a remote or in a local memory, e.g. a video memory or a RAM, a hard disk. In a variant, the epitome is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limitative embodiment, the apparatus 100 further comprises a computer program stored in the memory 120. The computer program comprises instructions which, when executed by the apparatus 100, in particular by the processor 110, make the apparatus 100 carry out the method described with reference to FIG. 3. According to a variant, the computer program is stored externally to the apparatus 100 on a non-transitory digital data support, e.g. on an external storage medium such as a HDD, CD-ROM, DVD, a read-only and/or DVD drive and/or a DVD Read/Write drive, all known in the art. The apparatus 100 thus comprises an interface to read the computer program. Further, the apparatus 100 could access one or more Universal Serial Bus (USB)-type storage devices (e.g., "memory sticks.") through corresponding USB ports (not shown).

According to exemplary and non-limitative embodiments, the apparatus 100 is a device, which belongs to a set comprising:

- a mobile device;
- a communication device;
- a game device;
- a tablet (or tablet computer);
- a laptop;
- a still image camera;
- a video camera;
- an encoding chip;

a decoding chip;
a display;
a still image server; and
a video server (e.g. a broadcast server, a video-on-demand server or a web server).

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The present principles find its interest in all domains concerned with the image epitome reduction. Applications related to video compression and representations of videos are concerned.

The invention claimed is:
1. A method for constructing an epitome from an image divided into non overlapping blocks comprising:
  determining, for each block of the block grid, similar patches of the pixel-grid in the image, a similar patch being a patch with content similar to the content of said current block; and
  constructing at least one epitome chart for said picture from said similar patches;
  wherein determining, for each block, similar patches in the image comprises:
  a) determining, for each current block, similar blocks in the image, a similar block being a block with content similar to the content of said current block, said determining comprising calculating a distance between content of said current block and content of blocks in the image and determining, as similar blocks, those blocks for which the calculated distance is below a first threshold value;
  b) determining, for one current block and for the similar blocks determined for said current block, similar patches in the image, a similar patch being a patch with content similar to the content of said current block, wherein said determining similar patches comprises:
    i) calculating a distance between content of said current block and content of patches in the image and determining, as similar patches, the patches for which the calculated distance is below a second threshold value higher than the first threshold value;
  c) determining, for similar blocks determined for said current block, among said similar patches, the similar patches whose distance to the current block is below a threshold value equal to the difference between said second threshold value and said first threshold value;
  d) repeating steps b) and c) for a next current block for which no similar patch is determined until at least one similar patch is determined for each block in the image.
2. A non-transitory processor readable medium having stored therein instructions for causing a processor to perform at least the steps of the method for constructing an epitome according to claim 1.

3. An apparatus for constructing an epitome from an image divided into non overlapping blocks comprising at least one processor configured to:
- determine, for each block of the block grid, similar patches of the pixel-grid in the image, a similar patch being a patch with content similar to the content of said current block; and
- construct at least one epitome chart for said picture from said similar patches;
- wherein to determine, for each block, similar patches in the image, said processor is further configured:
  - a) to determine, for each current block, similar blocks in the image, a similar block being a block with content similar to the content of said current block, wherein to determine, for each current block, similar blocks in the image comprises to calculate a distance between content of said current block and content of blocks in the image and to determine, as similar blocks, those blocks for which the calculated distance is below a first threshold value;
  - b) to determine, for one current block and for the similar blocks determined for said current block, similar patches in the image, a similar patch being a patch with content similar to the content of said current block, wherein to determine, for one current block and for the similar blocks, similar patches in the image comprises to calculate a distance between content of said current block and content of patches in the image and to determine, as similar patches, the patches for which the calculated distance is below a second threshold value higher than the first threshold value;
  - c) to determine, for similar blocks determined for said current block, among said similar patches, the similar patches whose distance to the current block is below a threshold value equal to the difference between said second threshold value and said first threshold value;
  - d) to repeat steps b) and c) for a next current block for which no similar patch is determined until at least one similar patch is determined for each block in the image.

* * * * *